US007805945B2

(12) United States Patent
Grote et al.

(10) Patent No.: US 7,805,945 B2
(45) Date of Patent: Oct. 5, 2010

(54) THERMAL SHIELD, ESPECIALLY FOR LINING THE WALL OF A COMBUSTION CHAMBER

(75) Inventors: Holger Grote, Bonn (DE); Wolfgang Kollenberg, Brühl (DE); Marc Tertilt, Hattingen (DE)

(73) Assignee: Siemens Aktiengesellschaft, Munich (DE)

( * ) Notice: Subject to any disclaimer, the term of this patent is extended or adjusted under 35 U.S.C. 154(b) by 1196 days.

(21) Appl. No.: 10/577,383

(22) PCT Filed: Oct. 27, 2004

(86) PCT No.: PCT/EP2004/012142

§ 371 (c)(1),
(2), (4) Date: Apr. 27, 2006

(87) PCT Pub. No.: WO2005/043058

PCT Pub. Date: May 12, 2005

(65) Prior Publication Data

US 2007/0028592 A1 Feb. 8, 2007

(30) Foreign Application Priority Data

Oct. 27, 2003 (EP) ................................. 03024560

(51) Int. Cl.
*F02C 1/00* (2006.01)

(52) U.S. Cl. .......................................... 60/753; 60/752

(58) Field of Classification Search ............ 60/752–760
See application file for complete search history.

(56) References Cited

U.S. PATENT DOCUMENTS 2,867,112 A 1/1959 Krone
3,918,255 A * 11/1975 Holden ........................ 60/753
4,189,301 A 2/1980 Twort
4,273,824 A * 6/1981 McComas et al. .............. 442/7
4,376,805 A 3/1983 Esnoult et al.
4,652,476 A * 3/1987 Kromrey .................. 428/34.1
4,835,831 A 6/1989 Melton
4,840,131 A 6/1989 Meumann et al.
5,921,751 A * 7/1999 Freling et al. ............... 415/200
6,155,040 A * 12/2000 Sasaki ......................... 60/806
6,465,110 B1 * 10/2002 Boss et al. .................. 428/608
6,607,358 B2 8/2003 Finn et al.
6,832,484 B2 12/2004 Hofmann et al.
2003/0177770 A1 * 9/2003 Hofmann et al. .............. 60/753

FOREIGN PATENT DOCUMENTS

EP 0 180 553 A1 5/1986

(Continued)

OTHER PUBLICATIONS

Database WPI; "Furnace Lining Heat Insulating Panel"; Abstract; Aug. 9, 1976; 1 Page; Section Ch.; Week 197711; XP002275667; AN 1977-19569Y, SU 521 428 A; Derwent Publications Ltd.; London, Great Britain.

*Primary Examiner*—Michael Cuff
*Assistant Examiner*—Phutthiwat Wongwian

(57) ABSTRACT

A highly durable, high-strength thermal shield element is provided for the interior lining of the combustion chamber of a gas turbine. For this purpose, the thermal shield element comprises a base produced from a solidified cast ceramic material into which a plurality of reinforcing elements are integrated, to increase the tensile strength of the thermal shield element.

12 Claims, 7 Drawing Sheets

FOREIGN PATENT DOCUMENTS

| | | | |
|---|---|---|---|
| EP | 0 350 647 | A1 | 1/1990 |
| EP | 0 419 487 | B1 | 4/1991 |
| EP | 0 724 116 | A2 | 7/1996 |
| EP | 1191285 | A1 | 3/2002 |
| GB | 2 080 928 | A | 2/1982 |
| SU | 521428 | | 7/1976 |
| WO | WO 99/47874 | A1 | 9/1999 |

* cited by examiner

THERMAL SHIELD, ESPECIALLY FOR LINING THE WALL OF A COMBUSTION CHAMBER

CROSS REFERENCE TO RELATED APPLICATIONS

This application is the US National Stage of International Application No. PCT/EP2004/012142, filed Oct. 27, 2004 and claims the benefit thereof. The International Application claims the benefits of European Patent application No. 03024560.9 filed Oct. 27, 2003. All of the applications are incorporated by reference herein in their entirety.

FIELD OF THE INVENTION

The invention relates to a heat shield element, in particular for the inner lining of a combustion chamber or a kiln. The invention also relates to a combustion chamber having an inner lining formed from heat shield elements and to a gas turbine having a combustion chamber.

BACKGROUND OF THE INVENTION

A combustion space subjected to high thermal and/or thermomechanical loading, such as, for example, a kiln, a hot-gas duct or a combustion chamber of a gas turbine, in which combustion space a hot medium is generated and/or directed, is provided with an appropriate lining for protection from excessively high thermal stressing. The lining normally consists of heat-resistant material and protects a wall of the combustion space from direct contact with the hot medium and from the high thermal loading associated therewith.

U.S. Pat. No. 4,840,131 relates to the fastening of ceramic lining elements to a wall of a kiln. There is a rail system here which is fastened to the wall. The lining elements have a rectangular shape with a planar surface and are made of heat-insulating, refractory, ceramic fiber material.

U.S. Pat. No. 4,835,831 likewise deals with the application of a refractory lining to a wall of a kiln, in particular to a vertically arranged wall. A layer consisting of glass, ceramic or mineral fibers is applied to the metallic wall of the kiln. This layer is fastened to the wall by metallic clips or by adhesive. A wire netting having honeycomb meshes is applied to this layer. The mesh netting likewise serves to prevent the layer of ceramic fibers from falling down. A uniformly closed surface of refractory material is additionally applied by being fastened by means of a bolt. The method described largely avoids a situation in which refractory particles striking during the spraying are thrown back, as would be the case when directly spraying the refractory particles onto the metallic wall.

A ceramic lining of the walls of combustion spaces subjected to high thermal stress, for example of gas turbine combustion chambers, is described in EP 0 724 116 A2. The lining consists of wall elements of structural ceramic with high temperature stability, such as, for example, silicon carbide (SiC) or silicon nitride ($Si_3N_4$). The wall elements are mechanically fastened elastically to a metallic supporting structure (wall) of the combustion chamber by means of a central fastening bolt. A thick thermal insulating layer is provided between the wall element and the wall of the combustion chamber, so that the wall element is at an appropriate distance from the wall of the combustion chamber. The insulating layer, which is approximately three times as thick as the wall element, is made of ceramic fiber material which is prefabricated in blocks. The dimensions and the external form of the wall elements can be adapted to the geometry of the space to be lined.

Another type of lining of a combustion space subjected to high thermal loading is specified in EP 0 419 487 B1. The lining consists of heat shield elements which are mechanically mounted on a metallic wall of the combustion space. The heat shield elements touch the metallic wall directly. In order to avoid excessive heating of the wall, e.g. as a result of direct heat transfer from the heat shield element or due to the ingress of hot medium into the gaps formed by the heat shield elements adjacent to one another, cooling or sealing air is admitted to the space formed by the wall of the combustion space and the heat shield element. The sealing air prevents hot medium from penetrating as far as the wall and at the same time cools the wall and the heat shield element.

WO 99/47874 relates to a wall element for a combustion space and to a combustion space of a gas turbine. Specified in this case is a wall segment for a combustion space to which a hot fluid, e.g. a hot gas, can be admitted, this wall segment having a mechanical supporting structure and a heat shield element fastened to the mechanical supporting structure. Fitted in between the metallic supporting structure and the heat shield element is a deformable separating layer which is intended to absorb and compensate for possible relative movements of the heat shield element and the supporting structure. Such relative movements can be caused, for example, in the combustion chamber of a gas turbine, in particular an annular combustion chamber, by different thermal expansion behavior of the materials used and by pulsations in the combustion space, which may arise during irregular combustion for generating the hot working medium. At the same time, the separating layer causes the relatively inelastic heat shield element to rest more fully over its entire surface on the separating layer and the metallic supporting structure, since the heat shield element penetrates partly into the separating layer. The separating layer can thus compensate for unevenness at the supporting structure and/or the heat shield element, which unevenness is related to production and may lead locally to unfavorable concentrated introduction of force.

In particular in the case of walls of high-temperature gas reactors, such as, for example, of gas-turbine combustion chambers operated under pressure, their supporting structures must be protected against a hot gas attack by means of suitable combustion chamber linings. Compared with metallic materials, ceramic materials are ideally suitable for this purpose on account of their high thermal stability, corrosion resistance and low thermal conductivity.

On account of material-specific thermal expansion properties under temperature differences typically occurring in the course of operation (ambient temperature during stoppage, maximum temperature at full load), the thermal mobility of ceramic heat shields as a result of temperature-dependent expansion must be ensured, so that no thermal stresses which destroy components occur due to restriction of expansion. This can be achieved by the wall to be protected from hot gas attack being lined by a multiplicity of ceramic heat shields limited in their size, e.g. heat shield elements made of an engineering ceramic. As already discussed in connection with EP 0 419 487 B1, appropriate expansion gaps must be provided between the individual ceramic heat shield elements, which expansion gaps, for safety reasons, must also be designed so that they are never completely closed in the hot state. In this case, it has to be ensured that the hot gas does not excessively heat the supporting wall structure via the expansion gaps. The simplest and safest way of avoiding this in a gas-turbine combustion chamber is the flushing of the expansion gaps with air, what is referred to as "sealing-air cooling". The air which is required anyway for cooling the retaining elements for the ceramic heat shields can be used for this purpose.

SUMMARY OF THE INVENTION

The object of the invention is to specify a heat shield element which has especially long service life at high strength. Furthermore, an especially low-maintenance combustion chamber and a gas turbine having such a combustion chamber are to be specified.

With regard to the heat shield element, this object is achieved according to the invention with a basic body which is formed from a strengthened cast ceramic material and in which a number of reinforcing elements are placed.

In this case, the invention is based on the idea that a heat shield element designed for especially long service life should be especially adapted to the external conditions of use. In order to make this possible and provide an especially high number of degrees of freedom for individual adaptation measures, the hitherto conventional production of heat shields by pressing is dispensed with and production by casting is now provided instead. However, in a cast ceramic heat shield, on account of only comparatively low tensile strength in particular in the longitudinal and transverse directions of the heat shield element, the service life of the heat shield element could be limited. In order to therefore enable a heat shield element based on a cast basic body to be used in a combustion chamber for utilizing the structural degrees of freedom achievable with said heat shield element, special measures with regard to the structural reinforcement of the basic body should be taken for long service life and increased passive safety, these measures also increasing the cohesion of the basic body in the event of possible crack formation.

In particular for increased tensile strength and for reducing crack lengths which could occur due to thermal and thermomechanical loads, reinforcing elements are therefore provided which are integrated in the basic body of the heat shield element. In this case, these reinforcing elements should be firmly connected to the heat shield element in order to transfer the material property of the tensile strength of the reinforcing element to the heat shield element. This function is performed by the reinforcing elements positioned inside the heat shield element, these reinforcing elements being integrally cast in the basic body by the ceramic casting material and being firmly connected to the basic body or to the ceramic as a result.

The structural degrees of freedom accompanying the use of a casting technique are advantageously used in the fashioning of the heat shield elements in particular for ensuring, by suitable geometries or local variations in characteristic material properties, an especially high loading capacity even during fluctuating thermal loads on the heat shield elements.

So that a reinforcing element is adapted to the high temperatures to which a heat shield element is exposed, and in addition firmly combines with the ceramic casting material during the casting process, the respective reinforcing element is advantageously formed from a ceramic material, preferably from an oxide-ceramic material having an $Al_2O_3$ proportion of at least 60% by weight and having an $SiO_2$ proportion of at most 20% by weight. This material has comparatively high tensile strength and firmly combines with the ceramic casting material on account of the similar mechanical materials during the solidifying. In addition, the thermal expansion of the reinforcing material is similar to the remaining ceramic material of the heat shield element, so that no unfavorable stresses occur in the heat shield element during temperature variations. Furthermore, the reinforcing element may expediently be produced from ceramic fibers such as, for example, CMC materials or from structural ceramic material having a pore proportion of at most 10%.

The respective reinforcing element is preferably designed like an elongated round ceramic rod in the manner of armoring. In order to integrate a reinforcing element especially firmly in a heat shield element and in order to design the reinforcing element to be as stiff as possible, the latter expediently has beads and thickened portions. The reinforcing element is anchored in the surrounding ceramic material via said beads and thickened portions, as a result of which the tensile strength of the reinforcing elements is transferred to the entire heat shield element. In a rod-shaped configuration, the reinforcing element may in particular have thickened portions at its end region, so that a bone shape is obtained. A positive-locking connection between reinforcing element and basic body is ensured by ends thickened in this way or also by rib-like thickened portions. Alternatively or additionally, this connection may also be made with a frictional grip, for example via a sintering operation or via granulation.

In order to reinforce a heat shield element over the entire surface, a reinforcing element may also expediently be designed in a plate shape, in which case in particular a flat plate arranged in parallel and at a distance from the surface of the basic body may be provided. Here, a plate may be positioned in each case on the side facing the working medium, while a plate for reinforcement is likewise assigned to the cooler side of the heat shield element.

In order to achieve as firm a material bond as possible between a reinforcing element designed as a plate and the surrounding ceramic material, such a plate advantageously has a number of apertures. As a result, the ceramic casting compound can pass into the apertures and also solidify there during the casting process of the heat shield element. In this case, the plate may be designed in particular as a perforated plate, the number, size and positioning of the holes expediently being selected as a function of intended use and material parameters.

In an alternative or additional advantageous embodiment, a reinforcing element of a heat shield element preferably has a lattice structure. In this case, the lattice elements may form a lattice structured with rhombic or square apertures. A reinforcing element may also be formed by a plate which has circular apertures which are positioned at uniform distances apart, so that a lattice-shaped structure is produced.

In order to strengthen or reinforce a heat shield element especially at the sides, a reinforcing element is expediently of rod-shaped design and positioned along a peripheral edge of the heat shield element.

In order to ensure the structural integrity of the heat shield element over its entire periphery even during incipient crack formation, a reinforcing element preferably has a closed annular shape and runs along the periphery of the heat shield element.

In order to increase even further the strength of such an annular reinforcing element and thus also that of the heat shield element and in order to design said reinforcing element and heat shield element in such a way that they are as torsionally rigid as possible, a reinforcing element is expediently designed as a circular ring.

For stabilizing and strengthening the corners of a heat shield element, the reinforcing element advantageously has a cross shape, the ends being positioned in the region of the corners of the heat shield element. For suitable bracing of the cross-shaped reinforcing element in the heat shield elements, this bracing increasing the tensile strength, the ends of the cross-shaped reinforcing element may be thickened, so that the reinforcing element is anchored in the heat shield element.

Heat shield elements of the type described above are expediently integral parts of the inner lining of a combustion chamber. This combustion chamber is advantageously an integral part of a gas turbine. In this case, the combustion chamber could be designed as a silo-shaped combustion chamber or as a combustion chamber composed of a plurality of smaller combustion systems, but is preferably designed as an annular combustion chamber.

The advantages achieved with the invention consist in particular in the possibility, with recourse to a casting process with the structural degrees of freedom possible as a result, of producing heat shield elements which have especially high tensile strength. By the integration of reinforcing elements in heat shield elements which are made of a cast ceramic material, it is possible to transfer the material properties of the reinforcing elements, such as in particular the tensile strength, to a heat shield element. In this case, the shaping of a heat shield element can be kept flexible. A further advantage consists in the fact that the possibility of selecting various embodiments of reinforcing elements and their positioning in the heat shield element permits individual adaptation to the thermal and mechanical loads acting on a heat shield element. On account of the increased strength of the heat shield elements, the service life of a heat shield element is also prolonged, since the spread of cracks is reduced and the structural integrity of the component (passive safety) is increased.

The advantage of a casting operation consists in the possibility of producing more complex shapes of heat shield elements. Thus, on the one hand, the external basic shape can be varied comparatively easily and at a low cost. On the other hand, it is possible in a casting operation to integrally cast arrangements for fastening the heat shield elements to the combustion chamber wall. Thus, for example, grooves, holes, threads or also retaining devices can be integrally cast in cast heat shield elements.

BRIEF DESCRIPTION OF THE DRAWINGS

An exemplary embodiment of the invention is explained in more detail with reference to the drawing, in which.

The same parts are provided with the same designations in all the figures.

DETAILED DESCRIPTION OF THE INVENTION

Figure 1:
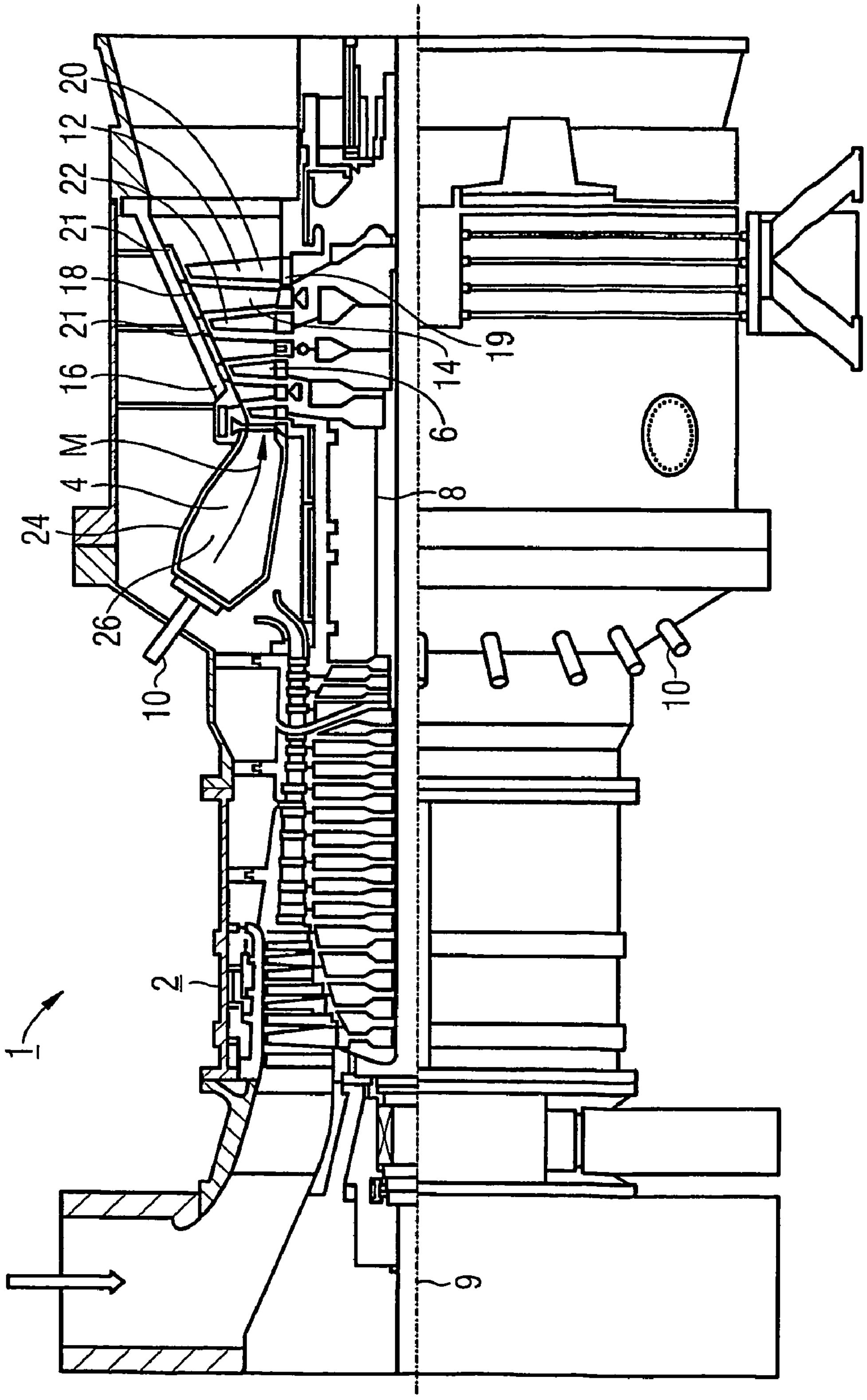
FIG. 1 shows a half section through a gas turbine.

The gas turbine 1 according to FIG. 1 has a compressor 2 for combustion air, a combustion chamber 4 and a turbine 6 for driving the compressor 2 and a generator (not shown) or a driven machine. To this end, the turbine 6 and the compressor 2 are arranged on a common shaft 8, which is also referred to as turbine rotor and to which the generator or the driven machine is also connected and which is rotatably mounted about its center axis 9. The combustion chamber 4, designed like an annular combustion chamber, is fitted with a number of burners 10 for burning a liquid or gaseous fuel.

The turbine 6 has a number of rotatable moving blades 12 connected to the turbine shaft 8. The moving blades 12 are arranged in a ring shape on the turbine shaft 8 and thus form a number of moving blade rows. Furthermore, the turbine 6 comprises a number of fixed guide blades 14, which are likewise fastened in a ring shape to an inner casing 16 of the turbine 6 while forming guide blade rows. In this case, the moving blades 12 serve to drive the turbine shaft 8 by impulse transmission from the working medium M flowing through the turbine 6. The guide blades 14, on the other hand, serve to direct the flow of the working medium M between in each case two moving blade rows or moving blade rings following one another as viewed in the direction of flow of the working medium M. A successive pair consisting of a ring of guide blades 14 or a guide blade row and of a ring of moving blades 12 or a moving blade row is in this case referred to as turbine stage.

Each guide blade 14 has a platform 18 which is referred to as blade root and is arranged as a wall element for fixing the respective guide blade 14 on the inner casing 16 of the turbine 6. In this case, the platform 18 is a component which is subjected to comparatively high thermal loading and forms the outer boundary of a hot-gas duct for the working medium M flowing through the turbine 6. Each moving blade 12 is fastened to the turbine shaft 8 in a similar manner via a platform 20 referred to as blade root.

A guide ring 21 is in each case arranged on the inner casing 16 of the turbine 6 between the platforms 18, arranged at a distance from one another, of the guide blades 14 of two adjacent guide blade rows. Here, the outer surface of each guide ring 21 is likewise exposed to the hot working medium M flowing through the turbine 6 and is kept at a radial distance from the outer end 22 of the moving blade 12 lying opposite it by means of a gap. In this case, the guide rings 21 arranged between adjacent guide blade rows serve in particular as cover elements which protect the inner wall 16 or other built-in casing components from thermal overstressing by the hot working medium M flowing through the turbine 6.

Figure 2:
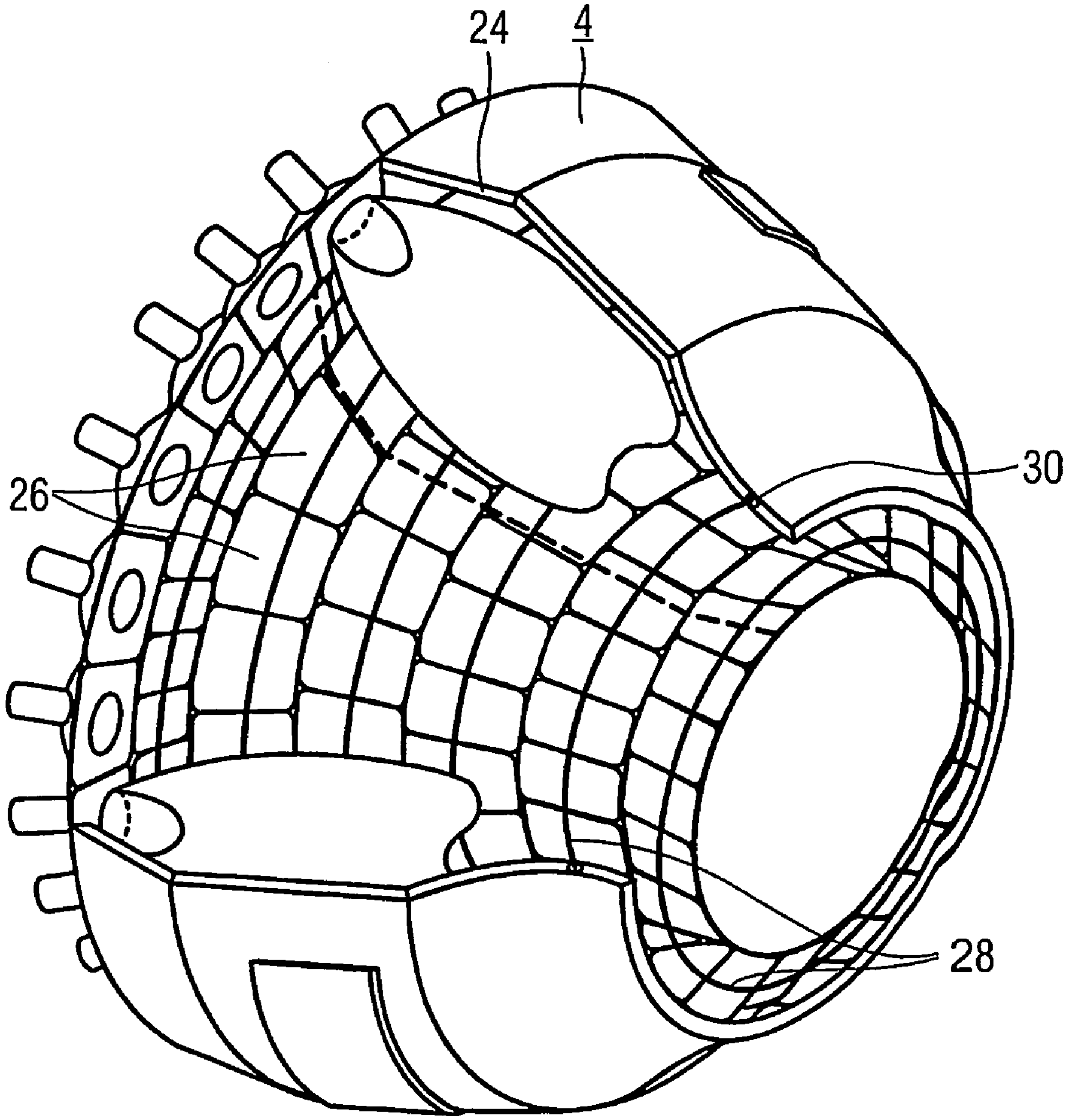
FIG. 2 shows the combustion chamber of the gas turbine according to FIG. 1.

In the exemplary embodiment, as shown in FIG. 2, the combustion chamber 4 is configured as an "annular combustion chamber", in which a multiplicity of burners 10 arranged in the circumferential direction around the turbine shaft 8 open out into a common combustion chamber space. To this end, the combustion chamber 4 is configured in its entirety as an annular structure which is positioned around the turbine shaft 8.

To achieve a comparatively high efficiency, the combustion chamber 4 is designed for a comparatively high temperature of the working medium M of about 1200° C. to 1500° C. In order to also permit a comparatively long operating period with these operating parameters, which are unfavorable for the materials, the combustion chamber wall 24 is provided on its side facing the working medium M with an inner lining formed from heat shield elements 26. On account of the high temperatures in the interior of the combustion chamber 4, a cooling system is provided for the heat shield elements 26.

The heat shield elements 26 are designed in particular for a long service life, so that as little damage as possible occurs due to the external effects, such as the high temperature and vibrations of the combustion chamber 4. To this end, said heat shield elements 26 consist of a basic body 28 which is formed from a cast ceramic material and in which reinforcing elements 30 are integrated. For suitable thermal stability of the reinforcing elements, they are made of a ceramic material or a composite material. To this end, the reinforcing elements 30 can be designed for the effects acting on the heat shield element 26. Various embodiments of heat shield elements 26 with reinforcing elements 30 are presented in FIGS. 3 to 7.

Figure 3:
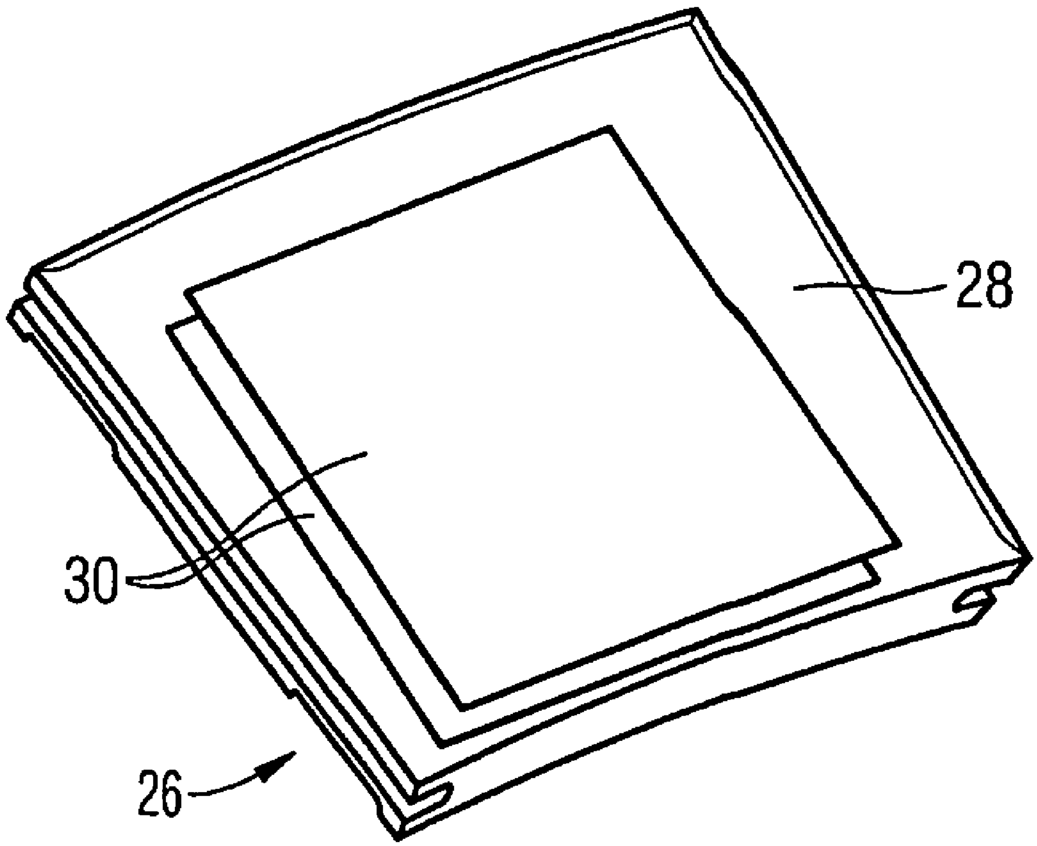
FIG. 3 shows a heat shield element with plate-shaped reinforcing elements.
Figure 4A:
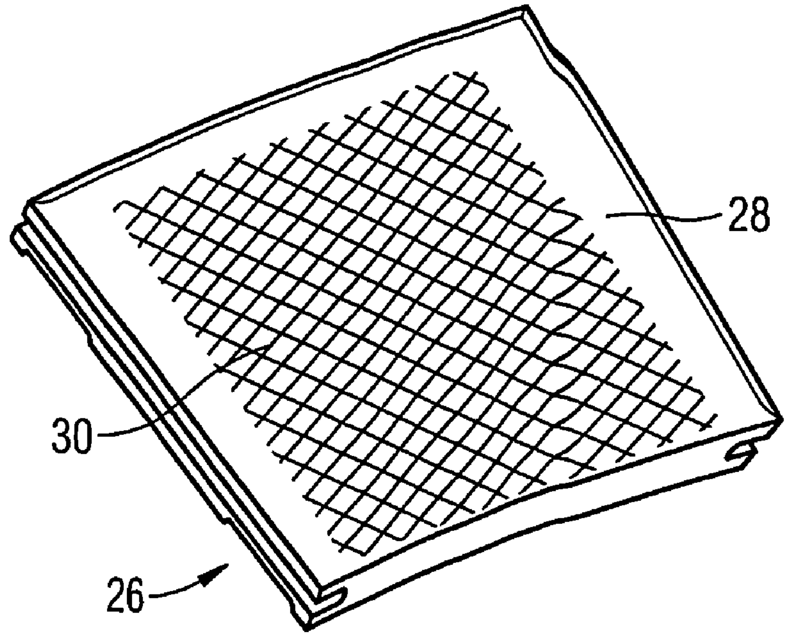
FIG. 4 shows a heat shield element with a lattice-shaped reinforcing element.
Figure 4B:
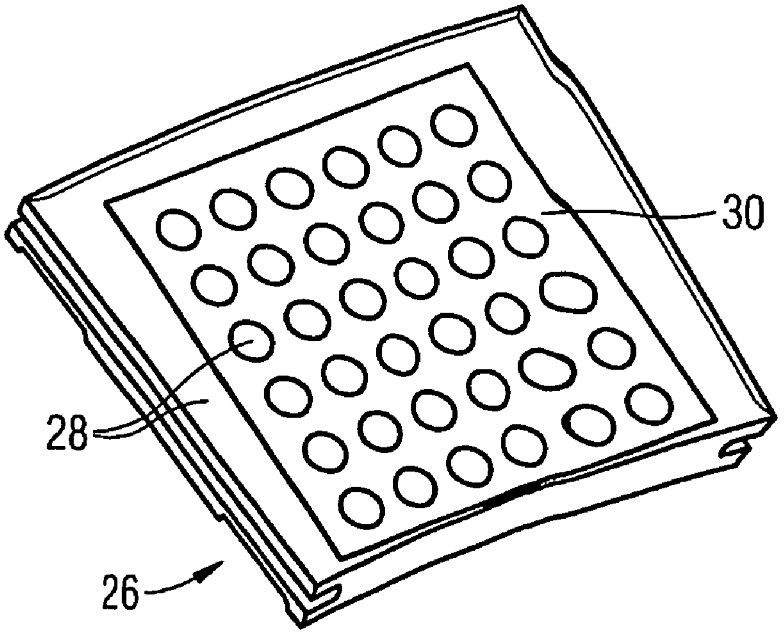

A heat shield element 26 with plate-shaped reinforcing elements 30 is shown in FIG. 3, a reinforcing element 30 being provided in each case for the surface facing the working medium M and the surface facing the cooled side. It can be seen in FIG. 4 that the plate-shaped reinforcing elements 30, for a better bond with the surrounding ceramic, may be provided with a lattice-shaped structure or may be designed as a lattice, in particular as a cross lattice (FIG. 4*a*) or as a perforated lattice (FIG. 4*b*).

Figure 5A:
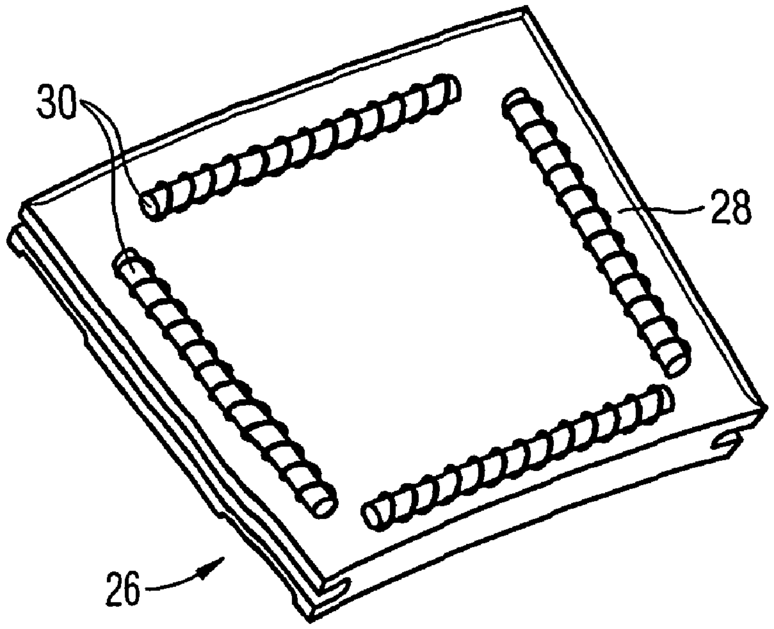
FIG. 5 shows a heat shield element with rod-shaped reinforcing elements.
Figure 5B:
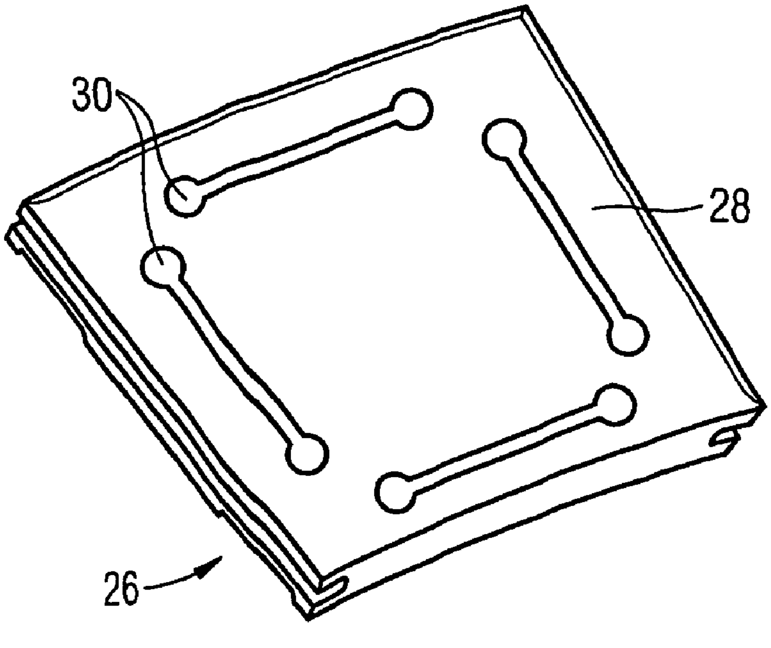
Figure 6A:
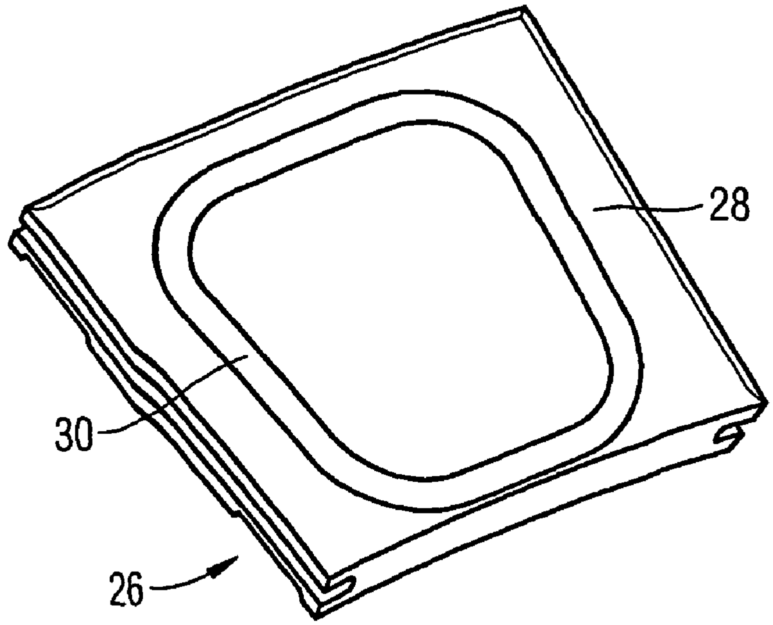
FIG. 6 shows a heat shield element with an annular reinforcing element.
Figure 6B:
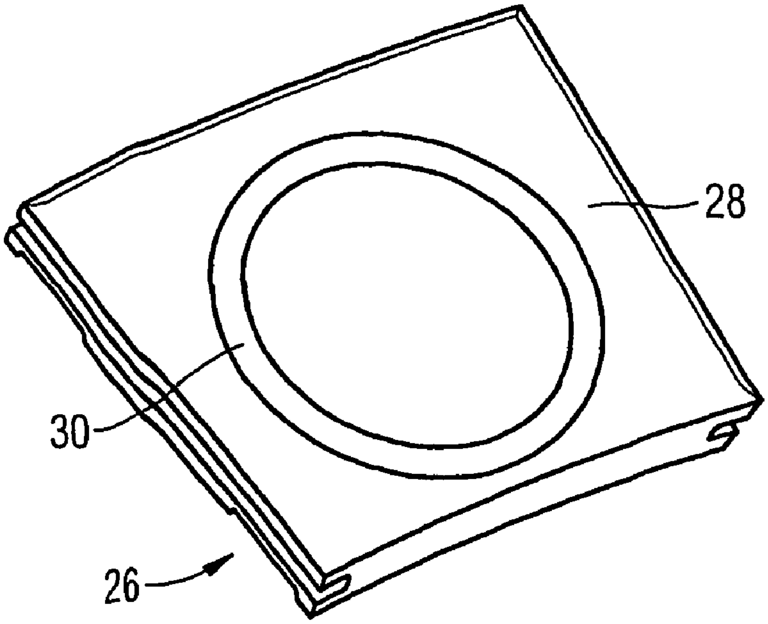
Figure 7:
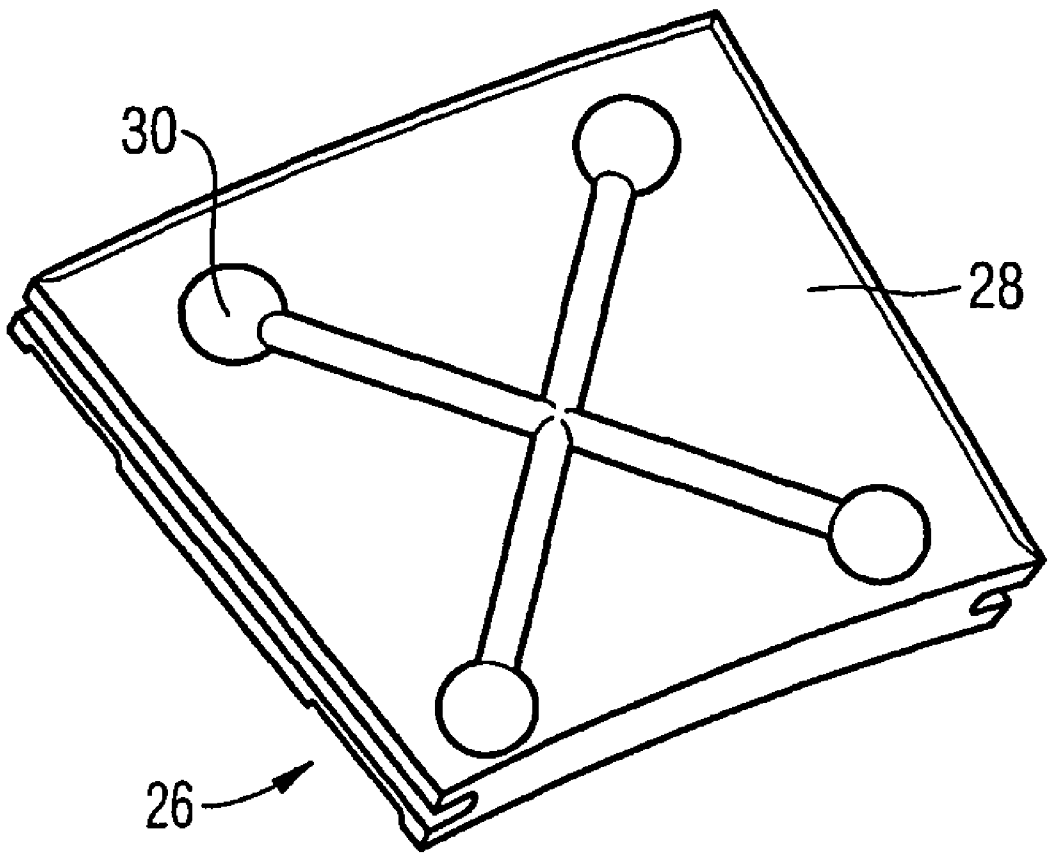
FIG. 7 shows a heat shield element with a cross-shaped reinforcing element.

For especially pronounced reinforcement of the marginal regions of a heat shield element 26, rod-shaped reinforcing elements 30 may be used, as shown in FIG. 5, these rod-shaped reinforcing elements 30 running along the side edges of a heat shield element 26 and being provided with beads or thickened portions (FIG. 5*a*) or thickened ends (FIG. 5*b*) in order to ensure firm anchoring in the surrounding ceramic 28. It can be seen from FIG. 6 that an annular structure (FIG. 6*a*) of the reinforcing elements 30 may be used for reinforcement of a heat shield element 26 along its periphery, in which case, in an especially torsionally rigid embodiment, this annular structure may be of circular design (FIG. 6*b*). In the heat shield element 26 shown in FIG. 7, a cross-shaped reinforcing element 30 is provided in order to brace the corners of a heat shield element 26 in a stabilizing manner, this cross-shaped reinforcing element 30 having thickened portions at each of its ends for anchoring in the ceramic material 26.

The invention claimed is:

1. A heat shield element, comprising:

a basic body formed from a strengthened ceramic material, said basic body including a first side that exposed to a combustion gas and a second side positioned opposite to the first side; and a pair of reinforcing contained within the basic body that increases the tensile strength of the heat shield element; said pair of reinforcing elements including a first and second reinforcing element taking a plate-shape form; wherein a surface of the respective first and second reinforcing element is respectively arranged in a parallel alignment with and at a distance from a surface of the respective first and second side of the basic body.

2. The heat shield element as claimed in claim 1, wherein the reinforcing element is formed from a ceramic composite material.

3. The heat shield element as claimed in claim 1, wherein the body is formed from a cast ceramic material.

4. The heat shield element as claimed in claim 1, wherein a working medium is incident on the first side of the basic body, such that a temperature of the first side is greater than a temperature of the second side.

5. The heat shield element as claimed in claim 4, wherein the working medium is incident on the first side at a temperature in a range of 1200-1500 ° C.

6. The heat shield element as claimed in claim 1, wherein the reinforcing elements are formed from an oxide-ceramic material having an $Al_2O_3$ proportion of at least 60% by weight.

7. A combustion chamber, comprising:

an annular combustion chamber wall having an inner surface;

a plurality of combustors arranged circumferentially through the combustion chamber wall; and a plurality of heat shield elements arranged on the inner surface to form an inner lining comprising a body formed from a ceramic material, said body including a first side and a second side positioned opposite to the first side; and a pair of reinforcing elements contained within the body that has a greater tensile strength that the tensile strength of the heat shield element, said pair of reinforcement elements including a first and second reinforcement element taking a plate-shaped form, wherein a surface of the respective first and second reinforcement element is respectively arranged in a parallel alignment with and at a distance from a surface of the respective first and second side of the body.

8. The combustion chamber as claimed in claim 7, wherein the body is formed from a cast ceramic material.

9. The combustion chamber as claimed in claim 7, wherein a working medium is incident to the combustion chamber and against the first side of the body, such that a temperature of the first side is greater than a temperature of the second side.

10. An axial flow gas turbine engine arranged about a central axis, comprising:

a rotor rotationally mounted about the central axis of the engine;

an intake housing that intakes air;

a compressor section that compresses the intake air; and an annular combustion chamber that accepts the compressed air, introduces a fuel and combusts the fuel and compressed air to provide a hot working fluid wherein the combustion chamber comprises:

an annular combustion chamber wall having an inner surface, a plurality of combustors arranged circumferentially through the combustion chamber wall, and a plurality of heat shield elements arranged on the inner surface to form an inner lining comprising a body formed from a ceramic material, said body including a first side and a second side positioned opposite to the first side; and a pair of reinforcing elements contained within the body that has a greater tensile strength than the tensile strength of the heat shield element, said pair of reinforcing elements including a first and second reinforcing element taking a plate-shape form; wherein a surface of the respective first and second reinforcing element is respectively arranged in a parallel arrangement with and at a distance from a surface of the respective first and second side of the body.

11. The axial flow gas turbine engine as claimed in claim 10, wherein the body is formed from a cast ceramic material.

12. The axial flow gas turbine engine as claimed in claim 10, wherein a working medium is incident to the combustion chamber and against the first side of the body, such that a temperature of the first side is greater than a temperature of the second side.

* * * * *